United States Patent [19]

Porath

[11] Patent Number: 5,269,819
[45] Date of Patent: Dec. 14, 1993

[54] AQUACULTURE PRODUCTION OF DUCKWEED FOR HUMAN CONSUMPTION

[75] Inventor: Dan Porath, Ramat Hanegev, Israel
[73] Assignee: Kibbutz Tzora, Israel
[21] Appl. No.: 769,062
[22] Filed: Sep. 30, 1991

[30] Foreign Application Priority Data

Feb. 10, 1990 [IL] Israel .................................... 95873

[51] Int. Cl.$^5$ ...................... A01G 31/00; A01G 33/00
[52] U.S. Cl. .......................................... 47/58; 47/1.4
[58] Field of Search ................. 47/1.401, 1.402, 1.403, 47/1.404, 1.405, 1.406, 1.407, 1.408, 1.409, 1.4, 58; 426/656; 210/151, 195.1

[56] References Cited

U.S. PATENT DOCUMENTS

| | | | |
|---|---|---|---|
| 2,732,663 | 1/1956 | Dewey, II | 47/1.4 |
| 4,063,383 | 12/1977 | Green | 47/1.105 |
| 4,169,050 | 9/1979 | Serfling et al. | |
| 4,536,988 | 8/1985 | Hogen | |
| 4,813,997 | 3/1989 | Kinnersley et al. | 47/1.402 |
| 4,820,527 | 4/1989 | Christensen et al. | 426/656 |
| 4,910,912 | 3/1990 | Lowery | 47/1.408 |

OTHER PUBLICATIONS

Landolt, Elias, "The Family of Lemnaceae—Amonographic Study, vol. 1", Biosystematic Investigations in the Family of Duckweeds (Lemnaceae), (vol. 2), Veroffentlichungen des Geobotanischen Institutes der ETH, Stiftung Rubel, Zurich 71 Heft, pp. 433–435 and 478 (1986).
Landolt, Elias et al., "The Family of Lemnaceae—a Monographic Study, vol. 2", Biosystematic Investigations in the Family of Duckweeds (Lemnaceae), Veroffentlichungen des Geobotanischen Institutes der ETH, Stiftung Rubel, Zurich 95 Heft, pp. 382–389 (1987).
Porath, D., et al., (1979), "Duckweed as an Aquatic Crop: Evaluation of Clones for Aquaculture", *Aquatic Botany*, 7, 273–278.
Porath, D., et al., (1980), "Morphological Patterns and Heterogeneity in Populations of Duckweeds", *Aquatic Botany*, 9, 159–168.
Feinbrun-Dothan, N., (1986), *Flora Palaestina*, Part 4, pp. 340–343.
Monselise, E. B., et al., (1979), "$NH_4^+$ on Assimilation with the Use of Nuclear Magnetic Resonance (NMR) System", *New Physiol.*, vol. 107, 341–345.
Gray, A., "Lemna Polyshiza", *Gray's Lessons in Botany*, Ivison, Blakeman, Taylor & Co., New York, 1880, p. 316.
Mabbery, D. J., "*Lemnaceae; Wolffia*", *The Plant Book*, Cambridge University Press, Cambridge, 1981, pp. 324 & 616.
Huxley, Anthony, et al., (Eds.), "Lemna", *Dictionary of Gardening*, 3, 1992, R.H.S., pp. 39 and 40.
Bailey, L. H., "Lemna", *The Standard Cyclopedia of Horticulture*, vol. II, MacMillan & Co., Inc., 1935, pp. 1836, 1837.
Bhalla, R.-R., et al., (1973), "Some Aspects of Flowering, Gibbosity and Turion Formation in Lemnaceae", Thomas Hunt Morgan School Biol. Sci., Univ. of Kentucky, Lexington, Ky., U.S.A., *Acta Bot. Neurl.*, 1973, 22:4, 433–445.
Elzenga, J. T. M., et al., (1980), "Further Indications that Ethylene is the Gibbosity Regulator of *Lemna gibba*", *Acta Bot. Neurl.*, 29:4, 225–229.
Lindley, J., "Order XXXIV. *Pistiaceae*—Lemnods, or Duckweeds", *The Vegetable Kingdom*, Bradbury & Evans, London, 1846, 124, 125.
Gleason, H. A., "Lemnaceae, the Duckweed Family", *Plants of the Vicinity of New York*, Hafner Pub. Co. Inc., N.Y., 1962, pp. 123, 124.

*Primary Examiner*—James R. Feyrer
*Attorney, Agent, or Firm*—Webb, Burden, Ziesenheim & Webb

[57] ABSTRACT

The invention provides an aquaculture complex for high protein crop production of a duckweed clone suitable for human consumption comprising a body of water in combination with duckweed clones, the majority of said clones being characterized by having less than three roots per clone, said roots being less than 15 mm in length and having at least two attached fronds, at least one of said fronds being characterised by a frond thickness greater than 1 mm and a frond length greater than 4 mm.

7 Claims, No Drawings

AQUACULTURE PRODUCTION OF DUCKWEED FOR HUMAN CONSUMPTION

The present invention relates to an aquaculture complex for high protein crop production of a duckweed clone suitable for human consumption and to comestible products for human consumption produced thereby.

The term "duckweed" as used herein refers to any plant that is a member of the botanical family of Lemnaceae, a family of small free floating aquatic plants.

The term "aquaculture" as used herein refers to specially constructed artificial ponds and all accessory coverings and systems.

The term "human consumption" refers to consumption of a product having an acceptable taste and texture, having nutritive value and being free of dangerous levels of contaminants.

Duckweeds are fast growing aquatic plants. They have been used for removal of excess mineral and organic nutrients from water as part of novel sewage disposal systems. In nature they grow at lake and pond edges because of their free floating nature, and the effects of wind. For sewage control special floating matrices and devices have been designed and patented by Lemna Corporation of Minnesota, U.S.A. to fully cover ponds. In nature, the duckweeds grow in coexistence with unicellular and filamentous algae; this mixture is sometimes seen dribbling from the mouths of moose and is known as "moose muck". Clearly such a mixture from nature is not suitable for human consumption, nor would duckweed from primary or most secondary sewage purification facilities be suitable for human consumption due to the presence of intestinal-microbe and virus contamination and/or heavy metal accumulation. In some circumstances, duckweeds thus grown could be used as animal fodder.

In Eastern Asia, duckweeds of Wollfia sp. are grown for human consumption in earthen ponds, but such material would not meet western specifications for human consumption as human wastes enter such ponds, either as fertilizer or as seepage, and nothing is done to control these contaminants.

Landolt, E. and Kandeler, R. (1987), The Family of Lemnaceae, a Monographic Study, Vol. 2, pp. 382-389, Veroffentlichungen des Geobotanischen Institutes der ETH Stiftung Rubel Zurich, 95 Heft, explains the restricted use of duckweeds as follows:

(1) Duckweeds especially of the genera Spirodela and Lemna often contain offensive amounts of oxalic acid. This is lacking in the smaller genera Wollfia and Wolfiella.

(2) The harvested Lemna are difficult to separate from snails, insects, worms, protozoa, algae and bacteria. Pond waters were reported to contain (per liter) $10^8$ coliform ($10^6$ fecal), $10^4$ fecal streptococi, 300 salmonella and shigella pathogens and pathogenic viruses. He states: "Further investigations on safe cultivation of Lemnacaceae are needed".

In Israel Patent 75435 there is described and claimed a method for determining the suitability of a duckweed clone for aquaculture comprising:

a. providing a plurality of containers with minerals and organic waste material intended for use as duckweed nutrient;

b. separately placing a predetermined density of biomass of a specific duckweed clone in an aqueous medium in each container;

c. adjusting and maintaining the ammonia concentration in said container in a range of about 25 to about 200 mg ammonia per liter;

d. measuring dry mass output, protein output and relative growth rate of various duckweed clones in said containers as a function of time; and e. selecting and cultivating duckweed clones which at an initial density of between about 400 g/m$^2$ and 600 g/m$^2$ yield a dry mass output of at least 7.5 g/m$^2$/day, and a protein output of at least 2.5 g/m$^2$/day, and exhibit a relative growth rate of at least 0.15 g/g/day in said aqueous medium.

The teachings of said patent, as relevant, are incorporated herein by reference.

Said patent showed how to select duckweed strains for rapid growth and nutrient utilization, with cultivation of duckweeds for fish and farm animal fodder and while a possible use also for human consumption was mentioned the clones used and described therein as well as the growth conditions utilized have been found not to be suitable for harvesting for human consumption.

The pioneer work of Edna Ben-Izhak Monselise, et al. on $NH_4^+$ on assimilation with the use of Nuclear Magnetic Resonance (NMR) system (New Phytol. (1987) 107, 341-345) questions the significance of the plurality of containers system suggested in Israel Patent 75435 for nutrient utilization by the different strains and instead suggests $NH_4^+$ uptake as the unique criteria for optimizing an aquaculture complex. The embodiments of the present study suggest a rather different and optimized manner of clone selection for human consumption as explained and exemplified herein.

During the course of our studies on duckweed growth, it was realized that clean-grown Lemna gibba strain Hurfeish isolated from nature and brought into axenic (contamination free) culture in the laboratory, was edible and neutral in taste.

It was found, however, that from a culinary/palatability point of view this strain would be unacceptable.

After experimentation with many strains and recurrent selection and cultivation there was developed according to the present invention an aquaculture complex for high protein crop production of a duckweed clone suitable for human consumption comprising a body of water in combination with duckweed clones, the majority of said clones being characterized by having less than three roots per clone, said roots being less than 15 mm in length, and having at least two attached fronds, at least one of said fronds being characterised by a frond thickness greater than 1 mm and a frond length greater than 4 mm.

Our panels have found that such duckweeds, produced with human safety considerations in mind have a high market potential as a luxury food in the class with cress and mustard sprouts, and are superior to various sprouted seeds.

A large number of duckweed species were cultured axenically and presented to taste and texture panels using the criteria of flavor, crispiness (vs. flaccidity) to touch, crunchiness in mouth, size, general appearance and color, root number and length. Flavor was defined as "harsh", "acid" or "neutral", with a certain tendency to a slightly sweet taste, in which "neutral" was defined as preferable for the embodiments of this invention, based on discussions with European experts on vegetable marketing. Strains with the preferred embodiments of this invention did not have organoleptic properties of "cabbage-like flavor" typical of the cress and mustard seedling, or the "moldiness" typical of alfalfa and grain sprouts. The panels found that roots were generally considered to be detrimental to the esthetic appearance and palatiblity of duckweeds for human consumption. Besides the esthetic problems, they cause packaging problems, and can be confused for filamentous algae or molds, especially when long and/or broken off. Thus, for the embodiments of this invention a domesticated strain should not have more than three, preferably only one, root per frond and it should be less than 15 mm long and for the preferred embodiments should be less than 10 mm long.

Thus it was found that a short root is much more desirable for commercial appearance and palatability than the larger size. We further correlated the commercially desirable crispiness with an anatomical feature of duckweeds known as "gibbosity", , i.e. an internal inflation of the frond. The potential for gibbosity is known to be species related but its extent can be physiologically controlled. For the embodiments of this invention the mature frond gibbosity as reflected in frond thickness of the largest frond should be greater than 1 mm and the preferred frond thickness for the embodiments of this invention should be greater than 1.4 mm. Mature frond length greater than 4 mm, and preferably greater than 4.5 mm is also preferred.

Another preferred feature contributing to gibbosity is that said fronds have air spaces which average at least 0.3 mm, contributing to the thickness, resiliency and crunchiness of the fronds.

In preferred embodiments of the present invention said aquaculture is used to produce clones characterized by an average number of fronds per clone of at least 2 and most preferred are clones having an average number of fronds per clone of at least 3.5.

In the development and research preceding and accompanying the present invention various duckweed strains were collected from different parts of the country. In addition, the following *Lemna gibba* clones were ordered and tested; Sms-G3 Smithsonian (Washington, D.C.) Rubel Institute (Zurich) collection clones (ETH) 7021, 7198, 7784, 8381, 8405, 8428, 8703.

Among the axenic cultures grown in our laboratory there was found, cultivated and developed a strain of *Limna gibba* L. which meets all of the above criteria and which therefore is ideally suited for use in aquaculture production of duckweed clones suitable for human consumption.

From this strain, a cultivated variety was obtained by recurrent selection that had especially large fronds, one short root, grew in a wide range of temperature and light conditions and was especially crisp. As indicated hereinbefore, from a culinary/palatability point of view, long roots and many roots are undesirable characteristics. This variety was designated as *Lemna gibba* L. cv Galilee and is being held by and is accessible from the inventor pending acceptance for deposit for patent purposes under the Budapest treaty with a recognized culture collection.

It can be described botanically as follows:

*Lemna gibba* L. cv Galilee is a free floating duckweed. In axenic steady state culture (in the laboratory, ¼ Hoagland Medium, 30 E m$^{-2}$S-1 continuous light) the mature frond appears flat and dark green. At least two light green daughter fronds emerge, sequentially, one from each of the two mature frond pouches. The length of the mature frond averages 5.3 mm and the average colony size, namely the number of attached fronds, is 4 to 5. Few colonies exceed 6 to 7 fronds, while very few appear as pairs or as a single frond. The root cap is indistinguishable from that of other Lemna species such as *L. Minor* L.

The number of clear meshes of the type described by Feinbrun-Dothan, N. (1986), Flora Palaestina, Part 4. pp. 340–343. The Israel Academy of Sciences and Humanities, Jerusalem, or air spaces as described by Landolt et al., 1987, Vol. 1, 71 Heft, pp. 54–57, ibid, in the ventral side of the frond exceeds 20.

In outdoor conditions, the fronds develop an inflated, spongy gibbous structure typical of many other *L. Gibba* clones as described in Porath, D., et al. (1980), Aquatic Botany, 9, pp. 159–168, Elsevier.

The most obvious and clear-cut characteristic of *Lemna gibba* L. cv. Galilee is its very short roots—less than 10 mm long, and usually 7 mm, even in old fronds. It is believed that the recurrent selection provided the shorter roots.

Alternatively, due to the extremely rapid doubling time of Lemna and the possibility to obtain $10^{20}$ generations within even one half a year as reported by Landolt, E. (1986). The Family of Lemnaceae—Monographic Study, Vol. 1, pp. 433–435, Veroffentlichangen des Geobotanischen Institutes der ETH, Stiftung Rubel, Zurich 71 Heft, the process of mutuation may be involved in the appearance of new clonal varieties and thus, *Lemna Galilee* may have arisen in this fashion. Landolt, 1986, ibid. p. 478, characterized 7 species of the section Lemna within the Lemnaceae in a quantitative method using several morphological and generative characters.

The following morphological characters are typical to *Lemna gibba* L. cv Galilee:
1. Lower surface of the frond is gibbous (1 to 3 mm thick, observed in outdoor growth conditions).
2. Mature fronds have an average length of 5.3 mm, an average width of 4.0 mm and a length to width ratio of 1.3 (observed in laboratory and outdoor conditions).
3. Air spaces are larger than 0.3 mm (observed in laboratory and outdoor conditions).
4. 3 to 5 nerves are observed in fronds grown in the laboratory. (Determined under a polarizing microscope following heating in tactic acid).

These characters serve to distinguish cv. Galilee as a variety of *L. gibba.*

*Lemna gibba* L. cv. Galilee meets all the criteria for the preferred embodiments of this invention described hereinbefore and was used as the standard against which other strains were compared. Other duckweed strains also approached *Lemna gibba* L. cv. Galilee and may be superior to it under certain environmental conditions. Human tastes vary from place to place and time to time and thus other duckweed strains, that meet local and temporal criteria for edibility and meet other criteria defined below, are among the embodiments of this invention.

Various uses of duckweeds were made to ascertain their utility for human consumption. *Lemna gibba* L. cv. Galilee was found to be acceptable to members of panels when eaten fresh by itself, or along with a variety of salad dressings or just with salt, pepper or a variety of flavored spices alone or with salad dressings.

Additionally, it was found to be compatible as a part of fresh and cooked vegetable and fruit salads, or as a fresh or cooked garnish, spread on top of such fresh or cooked fruit and/or vegetable salads. It was found to be useful as a component of soups, especially as a garnish placed floating on soups just prior to serving. It was useful as a component of quiches, stews, pizzas, vegetable and meat filled pastries or as a garnish thereupon. It was found useful as a garnish on hot and cold meat and fowl dishes and hors d'oeuvre. It could be mixed into gelatinized foods or used as a garnish, whether sweet (Jello) or piquant (aspics). It was acceptable when placed as a garnish on ice cream type desserts. The edible duckweed was acceptable both in fresh and processed frozen forms in all these uses, although some of the crispiness was lost in defrosted frozen material. All of these foods incorporating edible duckweed having the characterizing features defined are embodiments of this invention.

It has been also found that in optimal conditions the crop produced herein contains the essential amino acids lysine and methionine at levels comparable to those found in animal protein sources.

To meet with these criteria, the aquaculture systems of the present invention use duckweeds that originated from an axenic culture, and light, temperature, mineral and organic nutrition all designed to limit these contaminants and to decrease the contaminants to acceptable levels. These procedures are integrated with optimal growth procedures of the embodiment of this invention as described hereinafter.

Thus, e.g., the base of the aquaculture system is insulated from contaminated soil by a water and soil impervious material that has a very smooth surface on the upperside to prevent adherence of organisms. For the embodiment of this invention this can be a smoothed cement or concrete, fiberglass or sheets of any non-toxic plastic. We have found a dipterous organism that lays eggs on duckweeds, and its adults, larvae and pupae contaminate duckweed in nature. This can be controlled by many pesticides, and the preferred embodiment is to use pyrethom, a rapidly degradable, natural insecticide.

A preferable preferred embodiment is to use plastic mesh screening, e.g., artificial nylon of 1 mm or less pore size to cover the ponds. This exclusionary measure coupled with an axenic inoculum keeps insect problems to a minimum.

Duckweeds are excellent utilizers of organic materials and grow more quickly if such are added. Such organic materials also allow considerable bacterial growth and support some algal growth. To prevent this the following conditions are taught and preferred:
(a) there be a high density of duckweed in the pond at all times vis. more than 200 g fresh weight duckweed per square meter and preferably more than 400 g fresh weight duckweed per square meter surface;
(b) that the organic additives be either pure organic compounds (e.g. inexpensive organic acids and salts; sugars often inhibit growth); or
(c) that if sewage wastes are used they are not of human origin and have already undergone a thermophilic anaerobic fermentation that kills viruses and human pathogens;
(d) there be a filter system that removes much of the filamentous algal material during water circulation.

The final filter should exclude all particles larger than 10 m.

To prevent algal growth specifically, the following is also proposed and preferred:
(1) that the light levels are kept too low for adequate algal photosynthesis. We (and others) have found that light intensities above 150 uE/$M^2S$-1 do not add appreciably to duckweed photosynthesis. This light level is absorbed and utilized by the duckweeds. Higher levels penetrate the duckweeds and support algal growth. Two methods are combined as embodiments of this invention to limit light available for algal growth;
(a) screening above the ponds. This screening can be changed to allow different transmissions from the different available sunlight intensities with seasons and locale,
(b) there should be a minimal duckweed covering of the pond at all times of not less than 200 g fresh weight of duckweed per square meter surface.
(c) a filter system preferably used to circulate nutrient solution and keep the filamentous algal level low. The final filter in the system should exclude particles larger than 10 m.
(d) algicides are added that do not affect duckweed. This can be done where the algicide has been legally registered for such use.

The wind movement of duckweed to one side of aquaculture systems is a major obstacle to large scale culture. The problem was solved in sewage purification facilities utilizng duckweeds by the Lemna Corporation of Minnetonka, Minn., U.S. by having interlinked, floating open bottomed matrices covering the whole facility. Equal surface coverage is required to maintain low levels of algae when the duckweeds are cultivated for human consumption. It is an embodiment of this invention that covering the aquaculture facility with plastic netting, plastic sheeting, glass or any other partially transparent or translucent material prevents the duckweeds from becoming windswept to cover only part of the surface.

The duckweed species grown for human consumption in the Far East are grown on unsupplemented waters (Landolt and Kandeler, 1987, Vol. 2, ibid, p. 382). This does not give the growth rates for successful economic high intensity aquaculture. It is a preferred embodiment of this invention that when tap or rain water is used as the sole mineral nutritive source, it be supplemented with sufficient levels of the following elements in a form available to the plants: P, K, N, S, Ca. Fe. Mg, B. Mn. Cu, Zn, Mo, Cl. The supplementation must allow for rapid growth (biomass doubling time<4 days). A commercially available mixture, Nutricol No. 3 (Fertilizers and Chemical, Haifa, Israel) diluted 1:1000 was found to be an adequate "starter" mineral supplement to initiate rapid growth in the aquaculture complex. Nutricol 3 contains (according to the manufacturer (% by weight): nitrate N 4.5; ammonia N 3.0; $P_2O_5$ equivalents 3.2 (with half of the phosphate in polyphosphates); $K_1O$ 6.5; Fe 0.03; trace elements, 3.0. The trace elements contain per liter: 6 g Fe, 1 g Mn, 2 g/Zn, 0.4 Cu, 0.3 g Mo). Similar commercial preparations are also acceptable modifications, and they may be totally without nitrate nitrogen.

When a pond has reached a quasi-steady state growth with harvestable duckweed being removed to leave the preferred embodiment of the invention of about 400 g fresh weight per square meter surface, minerals are added to make up for those specifically used. Long term management has taught that a preferable embodiment is to not completely replace pond water, even while replacing duckweed removed from the pond. There is a growth advantage of "aged" aquaculture media. Thus in the preferred embodiments of this invention there is continually provided an adequate nutrient balance by:

(1) replacing evaporated water with water, to prevent the system from becoming concentrated,
(2) replacing part of the medium (preferably not more than 25% per week) by fresh Nutricol 3 (1:1000) or similar mix and/or
(3) replacing the missing elements, based on analysis, as utilized by the duckweeds. The major element utilized is ammonium nitrogen and its utilization can be roughly measured by following the pH drop and adding liquid ammonia or ammonium hydroxide through the filter system or in undiluted form directly to the aquaculture complex to bring the pH up to a preferred level of between about 5 and 6.5 with a pH level of 6.5 being especially preferred. Alternatively, a conductivity meter can be used as a rough indication of nutrient utilization allowing addback of a Nutricol 3 type mixture or just ammonium. With other mineral media, calibration will be necessary to supplement the medium according to this embodiment of the invention.

Analyses along with experience teach the operator how to replenish other mineral nutrients in the most cost effective manner.

The embodiment of this invention requires harvest at frequent intervals, i.e. every 2–4 days, preferably even daily to allow the maximal yield. There have been descriptions by the Lemna Corporation of harvesting equipment for duckweeds used in sewage purification. This is a floating apparatus that depresses the above described floating matrices and skims off part of the duckweeds. This apparatus is not appropriate for the present type of aquaculture system because of the size (width and height) and the seeming inability to fine tune it to the levels of harvesting needed. There has heretofore been designed, for use with aquaculture system of the present invention an adjustable harvester. It is comprised of a winch pulled sledge with an open base that is pulled along the bottom, or alternatively on rails outside the aquaculture system. From a guide along the top there are affixed bars with flat tines. The tines on both bars can be adjusted to overlap, giving maximal opening, i.e., leaving behind most of the duckweeds. When higher harvests are required, the tine bars can be adjusted to partially close the space between them. When the harvest is pulled to the nearest edge of the aquaculture facility, the basal sledge reaches a stop bar, overturning the duckweeds into readied mesh bottom crates, where they are drained. Alternatively, in small facilities an adjustable leaf rake can be used to remove the specified proportion of the duckweeds.

Various other environmental parameters have been developed to obtain duckweeds optimally suitable for human consumption; i.e., mature frond length, colony size, root length and gibbosity. These include temperature and light intensities. The preferred light intensity is the same as that used to limit algal growth, as cited above, along with the preferred embodiments to achieve it. Temperature is a major factor in governing growth rate.

The night temperature is less of a factor in obtaining suitable duckweeds. With *Lemna gibba* L. cv Galilee the night water temperature range meeting the embodiment of this invention is between 5° and 15° C. whereas the preferred day temperature range is between 20° and 25° C. Basically, the allowable night temperatures are achieved when the day temperatures optimal for the embodiment of this invention are achieved. We have found that in a windless situation, such as that in our described aquaculture system, it is the water temperature that best describes the microclimate temperature requirements of duckweed and not the air temperature. The preferred daytime water temperatures needed to meet the embodied requirements of this invention are between 20° and 25° C., with the preferred temperature range of 23° and 24° C. The day temperature can be modulated as follows to meet the embodiments. To increase the daytime temperature in winter use: (a) a shallow water depth of 3–25 cm, preferably 15–20 cm, which heats up relatively quickly during the day and/or (b) a clear plastic sheeting or glass or cellulated polycarbonate over the aquaculture facility to increase the greenhouse effect during the day and/or (c) heating the water leaving the filter circulation system as it returns to the facility and/or (d) a heating system tinder the ponds. The choice of heating system(s) depends on the climate at the locale of the aquaculture facility. To decrease the high external daytime temperatures it is possible as an embodiment of this invention to: (a) increase the depth of the water to 25–40 cm preferably 30–35 cm in the aquaculture system to decrease the rate of daytime heating, and/or (b) use heat reflective shading screening to decrease both light intensity (as needed for other reasons, see above) and to reflect part of the excess radiation, and/or (c) use water misting above and/or below the reflective screening to provide evaporative cooking and to replenish water evaporated from the surface and/or (d) use a cooling tower in conjunction with the filter system to cool circulated and filtered water prior to its return to the aquaculture facility.

The specific temperatures and conditions specified above as embodiments of this invention were for *Lemna gibba* L. cv Galilee. Other edible duckweed strains may have other preferred environments and one versed in the art will know how to modify conditions to best fit the strain and/or use different strains in different seasons to best fit ambient conditions.

The aquaculture system of the present invention is preferably also provided with a circulation and filtering system for reducing the total number of bacteria in the system which preferably includes a water germicidal UV radiation means such as the TAMI-10 Liquid Sterilizer ® produced by Kibbutz Nativ Halamed Heh, Israel.

As a further means of reducing total number of bacteria it was found that placing harvested clones in a perforated container before shipping, which can even be a perforated plastic bag, and immersing the same for 5–20 seconds in water at a temperature of 70°–90° C. is extremely effective and does not effect the crispiness of the product.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

Assessment of the optimal pH for protected outdoor duckweed aquaculture.

Each of 10 containers (0.2 m$^2$) was filled with 30 liters Nutricol-3 solution (diluted 1:1000 with tap water) and adjusted in duplicate, to the following pH levels: 5.0, 5.5, 6.0, 6.5 and 7.0. During the experiment, the water temperature fluctuated from 11° C. at night to 24° C. in the afternoon. The pH was re-adjusted daily to the initial pH with concentrated $H_3PO_4$ or $NH_4OH$ solutions. In optimal conditions, the daily change of pH is in the acidic direction of 0.1-0.2 unit per day. The initial density in each container was 400 g/m$^{-2}$. Duckweeds were harvested at intervals of 2-3 days, weighed, and 400 g/m$^{-2}$ returned to each container. The amount harvested is the Average Yield. The results indicate maximal yield at pH 6.5, a moderate decline toward lower pH levels and a sharp decline toward pH 7.0, as shown in Table 1.

TABLE 1

Average Yield vs pH of growth medium

| pH level | Average Yield | |
|---|---|---|
| | g m$^{-2}$ 11 d$^{-1}$ | g m$^{-2}$d$^{-1}$ |
| 7.0 | 523 | 47.5 |
| 6.5 | 865 | 78.6 |
| 6.0 | 743 | 67.5 |
| 5.5 | 740 | 67.2 |
| 5.0 | 705 | 64.1 |

1. Composition of Nutricol-3: (before dilution)

| N—NO$_3$ | (% wt) | 4.5 |
|---|---|---|
| N—NH$_4$ | (% wt) | 3.0 |
| P$_2$O$_5$ | (% wt) | 3.2 |
| K$_2$O | (% wt) | 6.5 |
| Fe | (mg/kg) | 300 |
| Microelements | (% wt) | 3.0 |

1 liter of concentrated microelements contains: 6 g Fe, 1 g Mn, 2 g Zn, 0.4 g Cu, 0.3 g Mo

EXAMPLE 2

Gibbosity and crispiness of duckweed grown in outdoor, protected conditions for human consumption.

The crispiness and crunchiness of *Lemna gibba* L. cv. Galilee is related to the existence of a swollen spongy "gibbous" tissue. The gibbosity gives the frond a specific touch feeling during handling and chewing. The gibbosity varies in different growth conditions and can be modified physiologically and genetically to a certain extent. The results are given in Table 2, while the parameters tabulated therein are explained immediately below.

Fresh weight—Biomass is harvested by raking or sieving, and was drained in cloth for 5 min. Fresh weights were then determined.

Gibbosity—A sample to be measured was removed by hand from the pond. The mature frond length was measured with a ruler or caliper.

Touch—A sample to be measured is removed by hand from the pond. The largest frond in a colony was placed between the fingers and its resiliency to finger pressure was scored as flaccid or crispy.

Crunchiness—Samples were removed by hand from the pond. Whole colonies were placed between the teeth and the degree of crunchiness determined on a scale of 1 to 4 (1=none, 2=little, 3=fair, 4=very good) by an investigator.

Taste—A sample to be measured was removed by hand from the pond. One or two colonies were placed in the mouth and chewed for 5-10 seconds and then swallowed. Neutral indicates no accompanying taste.

Standard Laboratory Conditions—$\frac{1}{4}$ Haogland solution, 30 Em$^{-2}$s$^{-1}$ white light, 22° C.

Outdoor aguaculture system—1:1000 Nutricol 3, pH 6., 11°-22° C.

TABLE 2

| Growth | Fresh weight (g) | Gibbosity (mm) | Touch | Crunch-iness | Taste |
|---|---|---|---|---|---|
| Standard laboratory conditions | 2.5 | 0.5 | flaccid | 1 | neutral |
| Outdoor aquaculture system | 2.5 | 1.5-3.0 | crispy | 4 | neutral |

EXAMPLE 3

Obtaining insect-free inocula of Lemna to maintain protected, outdoor aquaculture suitable for human consumption.

The effect of pyrethrum oil and piperonyl-butoxide emulsion (Piretrimi Organic, Rimi Chemicals. Ltd., 0.2% in tap water) on the growth, yield and dry matter of outdoor grown duckweed (*Lemna gibba* L. cv Galilee) was determined.

Inocula of duckweed which were infected with eggs, pupae, insect larvae or mature insects were dipped in 0.2% commercial pyrethrum emulsion containing piperonyl-butoxide for a short period of time to kill insects and other invertebrates present beneath or between the fronds. They were then immediately rinsed with tap water to diminish any negative effects of the oily emulsion on the duckweed and to wash away small dead organisms including insects.

A trial experiment was carried out as follows: 4 plastic containers, each with 30 liters of Nutricol-3 (diluted 1:1000), pH adjusted to 6.2 were prepared. A duckweed biomass of 300 g was dipped in a solution of insecticide (0.25 commercial pyrethrum oil containing piperonyl-butoxide, Piretrime Organic, Rimi Chemicals Ltd., O.B. 2951, Tel-Aviv), rinsed in tap water, and 100 g inoculated in each container as follows:

Container 1=not treated as above—Control
Container 2=1 min insecticide treatment
Container 3=2 min insecticide treatment
Container 4=5 min insecticide treatment Fresh weight was determined by weighing the biomass of each container, at the time indicated, after draining excess water from the fronds. Dry matter was determined by heating 100 g collected biomass for 24 hours in a drying oven at 60° C. The results, shown in Table 3, indicate no significant negative effect of the insecticide mixture on growth of plants after 2 minute treatment after one week. However, after 5 minute treatment there may have been some effect not seen 2 days after treatment. The dry matter in the different treatments was above 4%.

TABLE 3

| Container Number | Insecticide Treatment | Fresh weight | | | % Dry Wt. |
|---|---|---|---|---|---|
| | | 0 h | 48 h | 168 h | 168 h |
| 1 | none | 100 | 125 | 343 | 4.1 |
| 2 | 1 min | 100 | 124 | 336 | 4.3 |
| 3 | 2 min | 100 | 120 | 316 | 4.2 |
| 4 | 5 min | 100 | 135 | 266 | 4.2 |

EXAMPLE 4

Selection for duckweed clones from the *Lemna gibba*. Group suitable for commercialization and human consumption.

Previous selection procedures were concerned with clones from the entire duckweed family (Lemnaceae) suitable for aquaculture as animal feed (Israeli Patent No. 75435). The selection procedure described below is for clones specifically related to the *Lemna gibba* group within the Lemnaceae that have commercial potential as food for human consumption. Members of this group contain oxalate crystals (in raphide cells) that do not cause irritation to people (Landolt, 1986, Vol. 1, p. 62 ibid). Moreover, Porath D. et al (1979) Aquatic Botany, Vol. 7, pp. 223-228, Elsevier, Amsterdam, suggested that the *Lemna gibba*-like clones, which have larger fronds than the *Lemna minor* type are capable of producing high yields in crowded conditions. This is an advantageous characteristic for commercialization.

Step I. Selection in laboratory conditions

Mature frond size is an easily scored characteristic and important for the esthetic appeal of Lemna as a food for human consumption. Initial selection of clones was therefore done on this basis. An axenic collection of 35 *Lemna gibba* L. type clones, laboratory grown in ¼ strength Hoagland medium, continuously illuminated at 20 Em$^{-2}$s$^{-1}$ at 20°-25° C., were screened for size of the mature frond. Measurements were made with a ruler or caliper. All clones having mature fronds measuring 4.5 mm or longer from base to apex are listed in Table 4, and were subjected to further laboratory analysis.

Both root length and colony size (the number of attached fronds in a colony) are environmentally and genetically determined characteristics of Lemna clones (Porath et al. 1980, ibid). However, under defined laboratory conditions of monoculture, nutrition, depth of medium, colony density, illumination and temperature, expression of the genetic potential can be expected to predominate.

Based on esthetic values, feeling in the mouth, and suitability for culinary uses, short roots were deemed a preferable characteristic for Lemna as food for human consumption. Long roots accumulate contaminants, intertwine with other fronds to form clumps when harvested and packed, have a negative appearance, stick of sides of vessels, form clumps during cooking and produce an unpleasant feeling in the mouth. Large colony size was also considered to have an esthetic value as well as being an aid in harvesting. Under favorable growing conditions clone size is maintained, but under unfavorable conditions fronds tend to separate.

Fourteen clones of the 35 clones in stock collection had mature fronds longer than 4.5 mm. They were grown axenically in ¼ strength Hoagland medium in 250 ml flasks. (depth of medium, 30 mm), at 20 Em$^{-2}$s$^{-1}$ illumination at 20°-25° C. root length, frond length and colony size were scored when frond density was between 50-70% of the media surface. Root length of mature fronds was measured and noted. Mature frond length was measured with a caliper and colony size (n=the number of attached fronds in a colony) by visual counting. The results are presented in Table 4. Average values from several measurements are given. Clones that had a passing (P) grade were taken for outdoor analysis.

TABLE 4

| | Laboratory Selection | | | | | |
|---|---|---|---|---|---|---|
| | Frond length | | Colony size | Root length | | Grade |
| Clone | mm | score[1] | n | score[2] | mm | score[3] |
| Sms G3 | 5 | + | 3.9 | + | 21 | − | F |
| L. Galilee | 5.3 | + | 4.9 | + | 7 | + | cv. P[4] |
| ETH 7021 | 5 | + | 3.7 | + | 13 | V | P |
| ETH 7198 | 6 | + | 3.8 | + | 19 | − | F |
| ETH 7218 | 5.2 | + | 4.2 | + | 21 | − | F |
| ETH 7537 | 5 | + | 3.3 | − | 16 | − | F |
| ETH 7741 | 6 | + | 4.2 | + | 30 | − | F |
| ETH 7784 | 5 | + | 4.6 | + | 5 | + | P |
| ETH 7881 | 5 | + | 2.7 | − | 15 | − | F |
| ETH 8381 | 5 | + | 4 | + | 8 | + | P |
| ETH 8405 | 5 | + | 3.7 | + | 22 | − | F |
| ETH 8428 | 6.5 | + | 3.8 | + | 20 | − | F |
| ETH 8429 | 5 | + | 3.1 | − | 15 | − | F |
| ETH 8703 | 4.5 | + | 4.9 | + | 6 | + | P |

Clone SmsG3 is *Lemna gibba* L., Smithsonian strain G-3. Clones signed ETH came from the Rubel Instutite Collection of the Swiss National Technical University in Zurich.
[1] Frond length > 4.5 mm is scored at +
[2] Average colony size (n) > 3.5 is scored at +
[3] Root length < 15 mm is scored as +: v = marked variability in root length
[4] A Passing (P) grade is either +++ or ++V; any other grade is scored as fail (F).

Step II. Selection under outdoor, protected facility conditions of those strains which passed laboratory selection of Table 4.

Biomass formed per unit time is a clearly relevant parameter for commercial growth of Lemna for human consumption. Gibbosity, which did not develop under laboratory conditions, is likewise an important characteristic for commercialization because of its esthetic value, its relationship to crunchiness and taste, and its value in keeping Lemna afloat during harvesting. Gibbosity and growth rates, together with root length, colony size and mature frond length, were measured under outdoor, protected facility conditions for all clones scoring "passing" in Step I.

Cultures were transferred from axenic sterile culture to outdoor facilities. One gram of biomass from each clone was inoculated in uncovered plastic dishes 15×15×7 cm containing 750 ml of Nutricol 3, diluted 1:1000, and pH adjusted to 6.0-6.5. Following an 18 day period in winter (daily water temperature range, 8°-20° C.) the biomass formed was weighed, the gibbosity and frond length measured by caliper, the colony size visually counted and root length measured on milimetric paper.

Clones were scored by the following formula:

$$\frac{\text{Biomass} \times \text{Average colony size} \times \text{Frond length} \times \text{Gibbosity}}{\text{Root length}}$$

to arrive at the Outdoor Index. An outdoor index of >50 is considered commercially promising.

In the calculation a biomass in excess of 10 for the dishes of 15×15×7 is equivalent to a biomass of 440 g per square meter.

TABLE 5

| Clone | Biomass size (g) | Colony (n) | Outdoor Index Frond length (mm) | Gibbosity (mm) | Root length (mm) | Commercial features | Index |
|---|---|---|---|---|---|---|---|
| L. Galilee | 12 | 3.5 | 5.6 | 1.4 | 8[2] | 5 | cv 206 |
| ETH 8703 | 8 | 3.5 | 5.3 | 1.4 | 30 | 3 | 21 |
| ETH 7784 | 8.5 | 2.6 | 4.2 | 0.8 | 10[3] | 2 | 16 |
| ETH 7021 | 7.5 | 2.2 | 2.8 | 0.5 | 21 | 1 | 1 |
| ETH 8381 | 12 | 1.5 | 3.6 | 0.4 | 13 | 2 | 4 |

[1]Features are considered commercial when: Biomass > 10 g; average colony size > 3; Frond length > 4.5 mm; Gibbosity = 1 or more; Root length < 15 mm.
[2]Occasional long root (on less than 2% of fronds)

As can be seen *Lemna gibba* L. cv Galilee is far superior in its properties to all other clones tested and therefore is presently the preferred clone for use in the present invention.

EXAMPLE 5

Culinary use

*Lemna gibba* L. cv. Galilee cultivated in an aquaculture facility was presented to various taste panels in the following forms:

1. Uncooked (a) Alone, (either with or without tapwater rinse), or with salt or other seasonings added to taste, vegetable.

(b) 3-5 tablespoons of Lemna sprinkled on soup of choice.

(c) Liberally sprinkled on top of salads and seasoned to taste.

(d) Added to garnishes.

2. Cooked (a) Cheese Delight

Chopped, medium-large onions were fried in 1 tablespoon of oil until light brown. Two cups of *Lemna gibba* L. cv. Galilee and 50-100 grams chopped hard yellow cheese were added. The pan was covered and cooked on low heat for 1 minute, until the cheese melted. In various experiments spices were added to taste. In various permutations it was served on hot toast or on precooked puff pastry shell after baking for 10-15 minutes.

(b) Cheese Pie Crisp 1 cup *Lemna gibba* L. cv. Galilee
2 medium-large chopped onions fried
30 grams butter
2 crushed garlic cloves
0.5 cup flour
1 cup chopped mushrooms
50 grams grated cheddar cheese or, in another permutation, 50 grams grated Dutch-style hard cheese
1 tablespoon powdered vegetable soup mix spices: pepper, paprika, nutmeg to taste.

The onions were fried in 1 teaspoon of oil until light brown. *Lemna gibba* L. cv. Galilee was added to the mix just before baking.

Prepare puff pastry, spread or roll flat and place in baking pan. Spoon cheese mixture into pastry shell and bake in a preheated oven at 200° C. for 20 minutes.

(c) Vegetable Stew 1 medium-sized broccoli and 1 head of cauliflower were lightly cooked.

Onions were fried in 1 tablespoon of oil until brown together with 1 cup chopped mushrooms. 2 cups of *Lemna gibba* L. cv. Galilee were then added with the cooked vegetables cut into pieces. The mixture was covered and heated in a pan for 1 minute.

Other vegetables have been added/substituted in various permutations. These include green pepper, tomatoes, carrots, eggplant, and squash.

(d) Meat Pie

Browned ground beef and sliced cooked meat have been added to vegetable stew. The mixture was heated together with 1 tablespoon mushroom soup mix dissolved in ⅓ cup water for 1-2 minutes. The mixture was spooned into a pastry shell and baked in a preheated oven at 200° C. for 20 minutes.

(e) Eggs ala Lem Crisp 3-4 fresh green onions were chopoped and fried in a little oil or margarine.

500 grams *Lemna gibba* L. cv. Galilee were added 3 beaten eggs were added and cooked for 1-2 minutes uncovered.

(f) Egg Rolls

*Lemna gibba* L. cv. Galilee were rolled together with fried onions in puff pastry and baked in an oven for about 20 minutes.

Each of the above prepared comestible products received high ratings from the various taste panels indicating the commercial potential of this inexpensive high quality protein content product rich in lysine and methionine which are usually in low levels in plant products.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A method for selecting and culturing at least one duckweed clone palatably suitable for human consumption comprising selecting at least one clone characterized by having not more than three roots per clone, said roots being not more than 15 mm in length and having at least three attached fronds, at least one of said fronds being characterized by a mature frond thickness greater than 1.4 mm and a mature frond length greater than 4 mm, with at least one of said fronds having an air space therein averaging at least 0.3 mm to contribute to the thickness, resiliency and crunchiness of the fronds, culturing said at least one clone in an artificial pond which includes a base which is insulated from contaminating soil by a water and soil impervious material having a smooth upper side surface, and maintaining said at least one duckweed clone at a density of at least 200 g fresh duckweed per square meter surface, under conditions which prevent sexual reproduction and allow asexual, vegetative reproduction of said at least one clone, wherein said complex when maintained at a density of at least 400 g fresh duckweed per square meter surface yields a dry mass output of at least 7.5 g/m$^2$/day and a protein output of at least 2.5 g/m$^2$/day whereby the characteristics of said at least one clone are maintained.

2. The method according to claim 1 wherein said artificial pond is covered with a mesh screen covering of less than 1 mm pore size.

3. The method according to claim 1 wherein said artificial pond is covered with a solid transparent plastic sheet covering.

4. The method according to claim 1 wherein the pH of said at least one clone is maintained between about 5 and 6.5.

5. The method according to claim 1 wherein said one or more duckweek clones is maintained at a density of at least 400 g fresh duckweek per square meter surface.

6. The method according to claim 1 wherein said at least one clone are characterized by having not more than 1 root per frond.

7. The method according to claim 1 wherein said roots are not more than 10 mm in length.

* * * * *

UNITED STATES PATENT AND TRADEMARK OFFICE
CERTIFICATE OF CORRECTION

PATENT NO. : 5,269,819
DATED : December 14, 1993
INVENTOR(S) : Dan Porath

It is certified that error appears in the above-indentified patent and that said Letters Patent is hereby corrected as shown below:

Column 4 Line 31 "Lemna Galilee" should read --Lemna gibba Galilee--.

Column 4 Line 49 "tactic" should read --lactic--.

Column 5 Line 46 "I" should read --1--.

Column 8 Line 23 "tinder" should read --under--.

Claim 5 Lines 10-11 Column 16 delete "one or more" and insert --at least one--.

Signed and Sealed this

Fourteenth Day of June, 1994

Attest:

BRUCE LEHMAN

Attesting Officer

Commissioner of Patents and Trademarks